United States Patent
Hayami et al.

(10) Patent No.: US 12,062,970 B2
(45) Date of Patent: Aug. 13, 2024

(54) ELECTRIC MOTOR

(71) Applicant: Mitsubishi Electric Corporation, Tokyo (JP)

(72) Inventors: Naoki Hayami, Tokyo (JP); Tetsuya Sakurada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 17/790,998

(22) PCT Filed: Feb. 21, 2020

(86) PCT No.: PCT/JP2020/006998
§ 371 (c)(1),
(2) Date: Jul. 6, 2022

(87) PCT Pub. No.: WO2021/166212
PCT Pub. Date: Aug. 26, 2021

(65) Prior Publication Data
US 2023/0034637 A1    Feb. 2, 2023

(51) Int. Cl.
    H02K 9/06       (2006.01)
    H02K 1/20       (2006.01)
    H02K 1/32       (2006.01)
(52) U.S. Cl.
    CPC ............ H02K 9/06 (2013.01); H02K 1/20 (2013.01); H02K 1/32 (2013.01)
(58) Field of Classification Search
    CPC ............ H02K 1/20; H02K 1/32; H02K 9/06
    (Continued)

(56) References Cited

U.S. PATENT DOCUMENTS

| 6,570,276 B1 * | 5/2003 | Morel ............... F04D 29/5806 |
| | | 310/52 |
| 2004/0150270 A1 * | 8/2004 | Nagayama ............ H02K 5/207 |
| | | 310/59 |

(Continued)

FOREIGN PATENT DOCUMENTS

| JP | S5449520 U | 4/1979 |
| JP | S60151245 U | 10/1985 |
| JP | 2015012669 A | 1/2015 |

OTHER PUBLICATIONS

International Search Report (PCT/ISA/210) with translation and Written Opinion (PCT/ISA/237) mailed on May 26, 2020, by the Japan Patent Office as the International Searching Authority for International Application No. PCT/JP2020/006998. (8 pages).

(Continued)

*Primary Examiner* — Rashad H Johnson
(74) *Attorney, Agent, or Firm* — BUCHANAN INGERSOLL & ROONEY PC

(57) ABSTRACT

An electric motor includes a shaft supported rotatably around a rotation axis, a rotor located radially outward from the shaft and rotatable integrally with the shaft, and a stator radially opposing the rotor. At least one of the rotor or the stator includes a ventilation path that is a through hole. The ventilation path has a branched shape. A total length of inner circumferential surface lengths of branched ventilation paths in a cross section perpendicular to a penetration direction of the ventilation path is longer than an inner circumferential surface length of an unbranched ventilation path in the cross section perpendicular to the penetration direction.

18 Claims, 15 Drawing Sheets

(58) Field of Classification Search
USPC .................................. 310/52, 54, 58, 64
See application file for complete search history.

(56) References Cited

U.S. PATENT DOCUMENTS

| | | | | |
|---|---|---|---|---|
| 2006/0226717 | A1* | 10/2006 | Nagayama | H02K 9/06 310/58 |
| 2008/0036314 | A1* | 2/2008 | Kanei | H02K 9/227 310/59 |
| 2011/0241350 | A1* | 10/2011 | Kori | H02K 1/20 290/55 |
| 2012/0062057 | A1* | 3/2012 | Nagayama | H02K 9/26 310/59 |
| 2013/0119795 | A1* | 5/2013 | Haga | H02K 9/18 310/59 |
| 2014/0333163 | A1* | 11/2014 | Horii | H02K 9/10 310/59 |
| 2015/0000549 | A1 | 1/2015 | Nagayama et al. | |
| 2016/0134177 | A1* | 5/2016 | Itoh | H02K 9/06 105/59 |
| 2017/0005545 | A1* | 1/2017 | Kaneko | H02K 9/10 |
| 2019/0199162 | A1* | 6/2019 | Sato | H02K 5/207 |
| 2021/0083536 | A1* | 3/2021 | Baba | H02K 1/28 |
| 2021/0320555 | A1* | 10/2021 | Ajioka | H02K 1/32 |
| 2022/0239184 | A1* | 7/2022 | Ajioka | H02K 7/08 |
| 2022/0407389 | A1* | 12/2022 | Hayami | H02K 1/04 |
| 2024/0088754 | A1* | 3/2024 | Kaneko | H02K 9/06 |
| 2024/0113583 | A1* | 4/2024 | Tanaka | H02K 1/32 |
| 2024/0113598 | A1* | 4/2024 | Kastner | H02K 9/227 |

OTHER PUBLICATIONS

Japanese Office Action dated Apr. 5, 2022, issued for the corresponding JP Patent Application No. 2022-501547 and English translation. (8 pages).

* cited by examiner

ELECTRIC MOTOR

TECHNICAL FIELD

The present disclosure relates to an electric motor.

BACKGROUND ART

An electric motor has a shaft, a rotor that is fixed to the shaft to rotate together, and a stator that radially opposes the rotor to define a space therebetween. Energizing the electric motor leads to a rise in temperature of the stator and the rotor. The rise in temperature of the electric motor may, for example, accelerate deterioration of insulation of coils included in the electric motor and grease for lubricating bearing included in the electric motor, which can adversely affect increase in life of the electric motor. To cool components of the electric motor, some electric motors have ventilation paths, which are through holes, formed in at least one of the rotor or the stator. Air flows through the aforementioned ventilation path, an air gap between a stator core and a rotor core, and the like. This results in cooling of the stator, the rotor, and the like. An example of this type of the electric motor is disclosed in Patent Literature 1. In the electric motor disclosed in Patent Literature 1, air that flows into the interior by rotation of a fan flows through air holes formed in the stator core, and then flows out to the exterior. With this configuration, the stator and the rotor are cooled.

CITATION LIST

Patent Literature

Patent Literature 1: Unexamined Japanese Patent Application Publication No. 2015-12669

SUMMARY OF INVENTION

Technical Problem

Air downstream of the air hole has a temperature higher than air upstream of the air hole because, as the air flows through each air hole, heat is transferred from the stator core or the rotor core to the air. Thus, the cooling efficiency of a rotor conductor, a stator conductor, and the like by the air leaving the air hole is lower than the cooling efficiency of the rotor conductor, the stator conductor, and the like by the air before flowing into the air hole. Although the electric motor disclosed in Patent Literature 1 is an open electric motor, a similar problem also occurs in a totally enclosed electric motor because of decreased cooling efficiency of members located downstream of members that would have higher temperature.

In view of the above circumstances, an objective of the present disclosure is to provide an electric motor with high cooling efficiency.

Solution to Problem

To achieve the above objective, an electric motor according to the present disclosure includes a shaft, a rotor, and a stator. The shaft is supported rotatably around a rotation axis. The rotor is located radially outward from the shaft and is rotatable integrally with the shaft. The stator radially opposes the rotor to define a space therebetween. At least one of the rotor or the stator includes a ventilation path that is a through hole. The ventilation path has a branched shape from an upstream end to a plurality of downstream ends. A total length of inner circumferential surface lengths of branched ventilation paths in a cross section perpendicular to a penetration direction of the ventilation path is longer than an inner circumferential surface length of an unbranched ventilation path in the cross section perpendicular to the penetration direction. The branched ventilation paths are branched portions of the ventilation path and the unbranched ventilation path is an unbranched portion of the ventilation path.

Advantageous Effects of Invention

The electric motor of the present disclosure includes a ventilation path having a branched shape. The total length of the inner circumferential surface lengths of the branched ventilation paths is longer than the length of the inner circumferential surface length of the unbranched ventilation path, thus resulting in an electric motor with high cooling efficiency.

DESCRIPTION OF EMBODIMENTS

Figure 1:
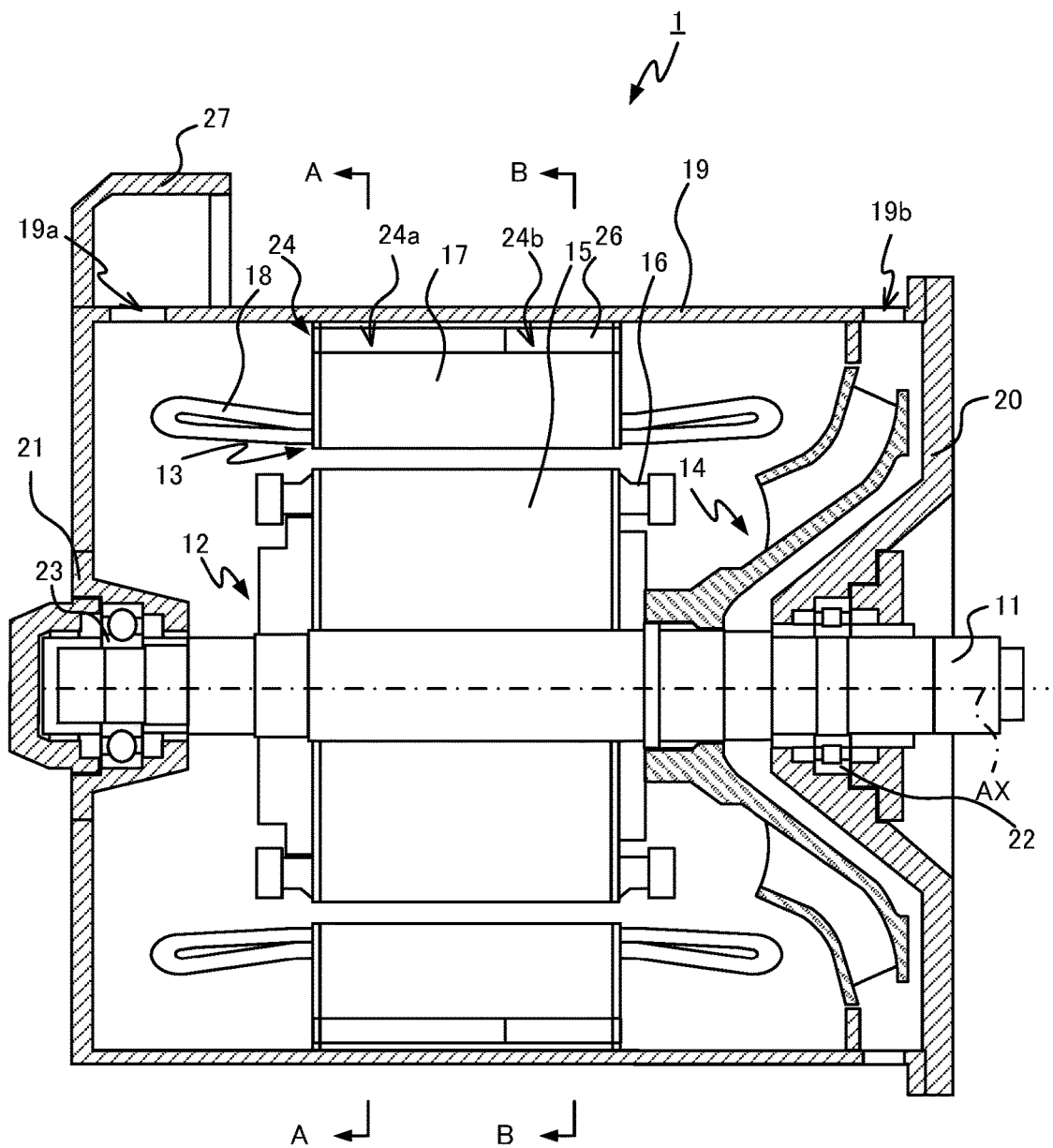
FIG. 1 is a cross-sectional view of an electric motor according to Embodiment 1.

An electric motor according to embodiments is hereinafter described in detail with reference to the drawings. The same reference numerals are used throughout the drawings to refer to the same or equivalent components.

Embodiment 1

An electric motor according to Embodiment 1 is described using as an example an electric motor to be used for drive of a railway vehicle. The electric motor according to Embodiment 1 is illustrated in FIG. 1. In FIG. 1, a Z axis is in a vertical direction, a Y axis is in parallel to a rotation axis AX of a shaft 11, and an X axis is orthogonal to the Y axis and the Z axis. In FIG. 1, the rotation axis AX is indicated by a dot-and-dash line. The electric motor 1 illustrated in FIG. 1 includes the shaft 11 supported rotatably around the rotation axis AX, a rotor 12 located radially outward from the shaft 11 and rotatable integrally with the shaft 11, a stator 13 radially opposed to the rotor 12, and a fan 14 rotatable integrally with the shaft 11. As described in detail below, a stator core 17 included in the stator 13 has ventilation paths, which are through holes, having a branched shape from an upstream end to a plurality of downstream ends. Thus, in a cross section perpendicular to a penetration direction of the ventilation path, an inner circumferential surface length of the ventilation path is longer than that of an upstream portion of the ventilation path. This results in improved cooling efficiency in downstream portions of the ventilation path.

The electric motor 1 further includes a frame 19 having an inflow hole 19a that allows air from the outside to flow into the interior and an outflow hole 19b that allows the inflow air to flow outside. The electric motor 1 further includes a first bracket 20 fixed to the frame 19 and a second bracket 21 fixed to the frame 19 so as to be opposed to the first bracket 20 in a direction parallel to the rotation axis AX. The first bracket 20 and the second bracket 21 arranged such that the rotor 12, the stator 13, and the fan 14 are located between the first bracket 20 and the second bracket 21. The electric motor 1 further includes bearings 22 and 23 supporting the shaft 11 rotatably. The electric motor 1 preferably includes a cover 27 for covering the inflow hole 19a to prevent dust, moisture, and other foreign matter from entering the interior.

Details of each component of the electric motor 1 are described in detail. One end of the shaft 11 near the first bracket 20 is connected to an axle of the railway vehicle via an unillustrated coupling and an unillustrated gear, and the railway vehicle is powered by the rotation of the shaft 11.

The rotor 12 includes a rotor core 15 fixed to the shaft 11 and rotor conductors 16 inserted into slots formed on the outer circumferential surface of the rotor core 15. With the rotor core 15 fixed to the shaft 11, the rotor 12 including the rotor core 15 and the rotor conductors 16 rotates integrally with the shaft 11.

Figure 2:
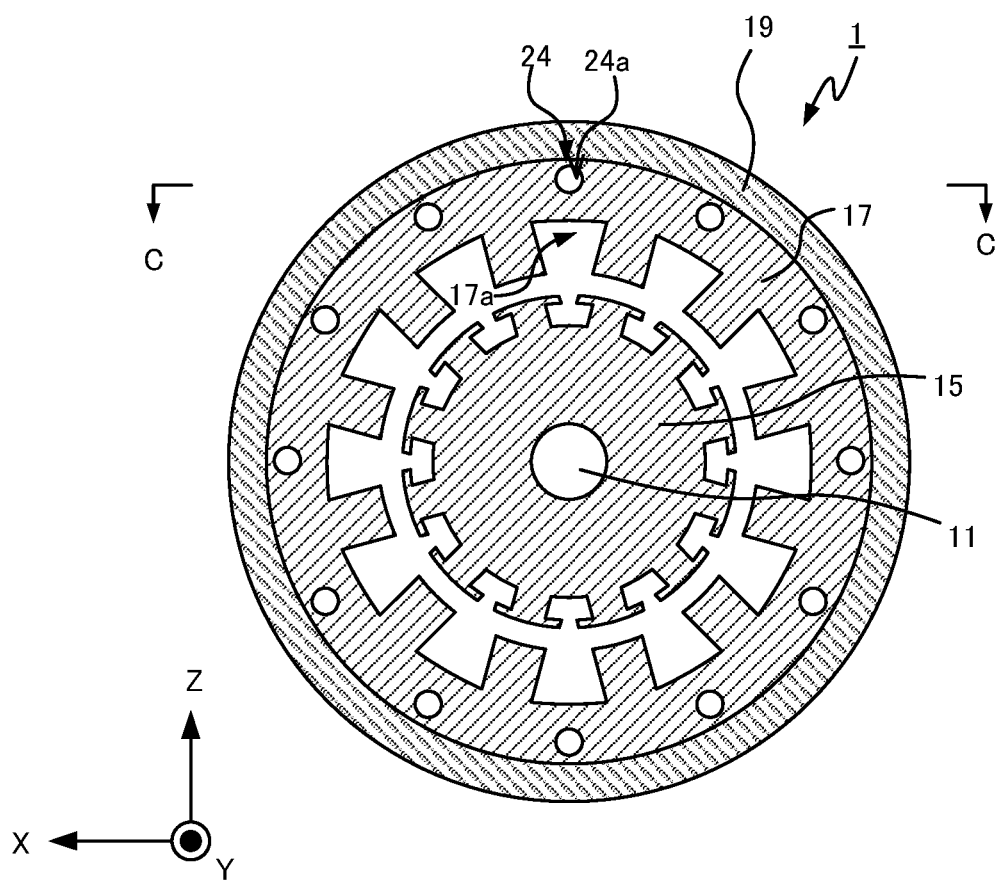
FIG. 2 is a cross-sectional view of the electric motor according to Embodiment 1, taken along line A-A of FIG. 1.

The stator 13 includes the stator core 17 and coils 18 inserted into later-described slots 17a formed in the stator core 17. The stator core 17 radially opposes the rotor core 15 to define a space therebetween. The stator core 17 also includes ventilation paths 24, which are through holes. As illustrated in FIG. 2, which is a cross-sectional view taken along line A-A of FIG. 1, the slots 17a into which the coils 18 are inserted are formed on the inner circumferential surface of the stator core 17. In FIG. 2, components of the electric motor 1 other than the shaft 11, the rotor core 15, the stator core 17, and the frame 19 are omitted to simplify illustration.

Figure 3:
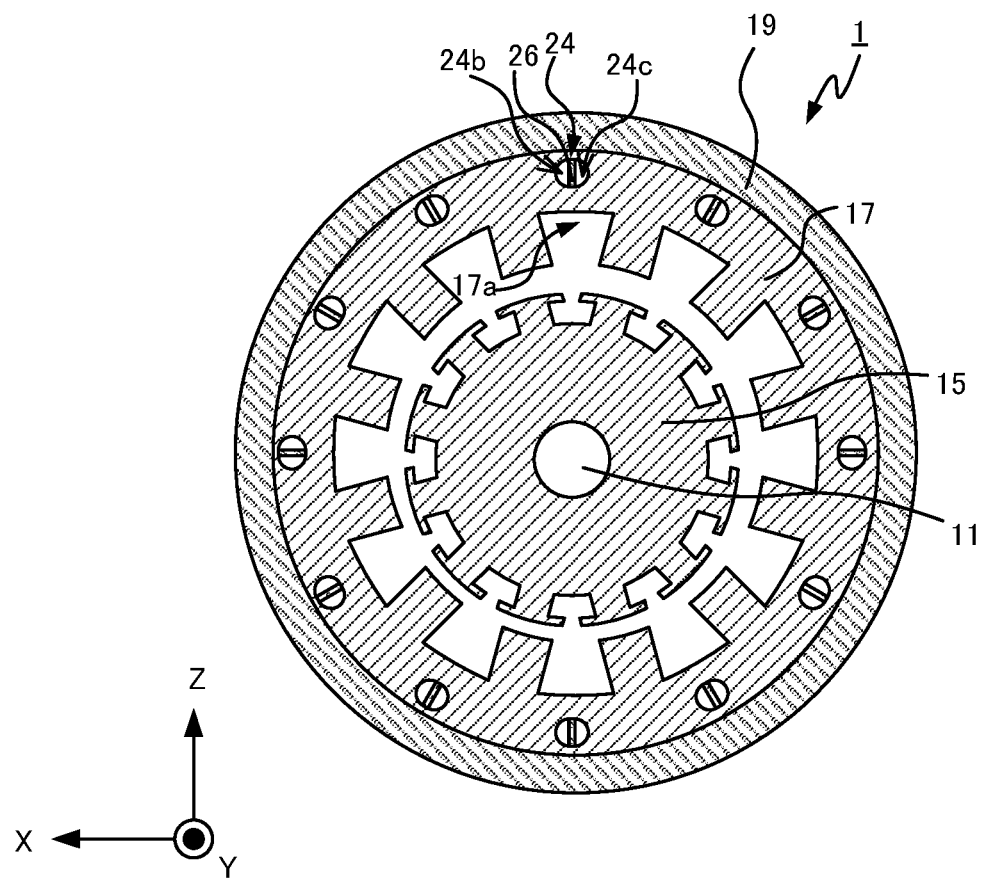
FIG. 3 is a cross-sectional view of the electric motor according to Embodiment 1, taken along line B-B of FIG. 1.

The fan 14 illustrated in FIG. 1 has a main surface facing the first bracket 20, and rotates integrally with the shaft 11. The first bracket 20 holds the bearing 22. The second bracket 21 holds the bearing 23. The bearings 22 and 23 support the shaft 11 rotatably around the rotation axis AX The ventilation paths 24 are located radially outward from the slots 17a into which the coils 18 are inserted, and extend through the stator core 17 in a direction parallel to the rotation axis AX. The ventilation paths 24 have a branched shape from the upstream end to the plurality of downstream ends. Specifically, as illustrated in FIG. 1, the ventilation path 24 includes an upstream ventilation path 24a having one end facing the second bracket 21. In addition, the ventilation path 24 includes downstream ventilation paths 24b and 24c having one end connected to another end of the upstream ventilation path 24a and another end facing the first bracket 20, as illustrated in FIG. 3, which is a cross-sectional view taken along line B-B of FIG. 1, and FIG. 4, which is a cross-sectional view taken along line C-C of FIG. 2. With this configuration, the ventilation path 24 has a branched shape from the upper end facing the second bracket 21 to the plurality of downstream ends facing the first bracket 20.

Lengths of wetted perimeters of the branched ventilation paths 24 are longer than a length of a wetted perimeter of the unbranched ventilation path 24. Here, the length of the wetted perimeter means a length of a wall surface of a flow path that contacts fluid in a cross section perpendicular to the penetration direction of the flow path. Thus the length of the wetted perimeter of the ventilation path 24 of the electric motor 1 means an inner circumferential surface length of the ventilation path 24 in the cross section perpendicular to the penetration direction of the ventilation path 24. Specifically, a total length of the inner circumferential surface lengths of the downstream ventilation paths 24b and 24c in an XZ plane is longer than the inner circumferential surface length of the upstream ventilation path 24a in the XZ plane.

Preferably, the cross-sectional area of the upstream ventilation path 24a in the XZ plane can be considered to match a total area of the cross-sectional areas of the downstream ventilation paths 24b and 24c in the XZ plane. In other words, preferably, the cross-sectional area of the ventilation path 24 can be considered to be constant from the upstream end to the plurality of downstream ends. This can suppress reduction of cooling efficiency caused due to increase in ventilation resistance of the ventilation path 24 due to large variations of the cross-sectional areas due to branching.

An example range in which the cross-sectional area of the upstream ventilation path 24a in the XZ plane can be considered to match the total area of the cross-sectional areas of the downstream ventilation paths 24b and 24c in the XZ plane is a case in which a ratio of the cross-sectional area of the upstream ventilation path 24a in the XZ plane to the total area of the cross-sectional areas of the downstream areas 24b and 24c in the XZ plane is in a range of 1.0:0.8 to 1.0:1.2. To suppress the reduction of the cooling efficiency, more preferably, the ratio of the cross-sectional area of the upstream ventilation path 24a in the XZ plane to the total area of the cross-sectional areas of the downstream ventilation paths 24b and 24c in the XZ plane is in a range of 1.0:0.9 to 1.0:1.1.

For example, as illustrated in FIG. 2, the shape of the upstream ventilation path 24a in the XZ plane is circular. As illustrated in FIG. 3, the shapes of the downstream ventilation paths 24b and 24c in the XZ plane are semicircular. The downstream ventilation paths 24b and 24c are arranged with chords of the semicircles facing each other in the XZ plane. In FIG. 3, components of the electric motor 1 other than the shaft 11, the rotor core 15, the stator core 17, and the frame 19 are omitted to simplify illustration.

Figure 4:
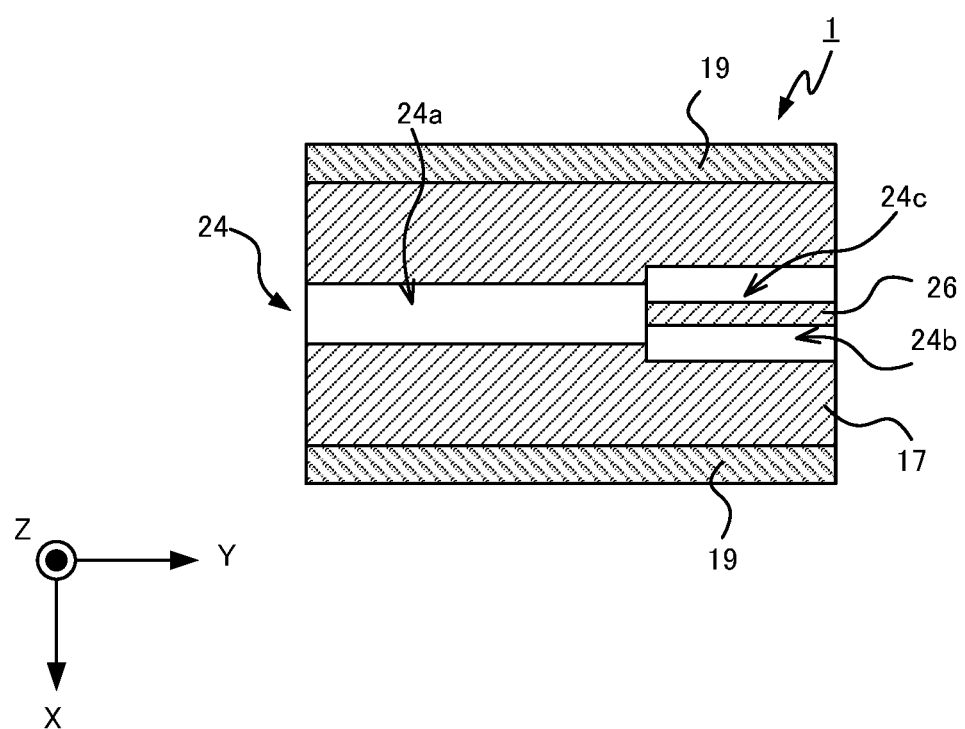
FIG. 4 is a cross-sectional view of the electric motor according to Embodiment 1, taken along line C-C of FIG. 2.

For example, as illustrated in FIGS. 3 and 4, the ventilation path 24 is formed by providing in the through hole a partition member 26 that partitions the downstream portion of the through hole. The downstream portion of the through hole means a portion downstream from the middle of the through hole in a Y-axis direction.

Specifically, the ventilation path 24 is obtained by inserting the partition member 26 having a plate-like shape into a through hole having a cross section of the upstream portion perpendicular to the penetration direction having a circular shape and a cross section of the downstream portion perpendicular to the penetration direction having a shape obtained by connecting outer edges of two circles by straight lines, the two circles having the same diameters as the circular cross section of the upstream portion. By providing the plate-like partition member 26 having a thickness that is the same length as the lengths of the straight lines connecting the outer edges of the two circles having the same diameter, the ventilation path 24 can be obtained in which the cross-sectional area of the upstream portion in the cross section perpendicular to the penetration direction can be considered to match the cross-sectional areas of the downstream portions in the cross sections perpendicular to the penetration direction.

The location of the branching is preferably closer to the plurality of downstream ends than the middle of the ventilation path 24, that is, closer to a plurality of ends facing the first bracket 20.

By providing the ventilation path 24 having the aforementioned structure, the cooling efficiency of the ventilation path 24 in the downstream portion can be increased relative to that of the ventilation path 24 in the upstream portion.

The downstream ventilation paths 24b and 24c are preferably arranged adjacent to each other. Specifically, the downstream ventilation paths 24b and 24c are preferably arranged adjacent to each other to the extent that changes in air flow velocity caused by air hitting the partition member 26 that causes branching of the ventilation path 24 can be suppressed. In a case where the ventilation path 24 is formed by inserting the partition member 26 into the through hole, the partition member 26 is preferably thin enough not to obstruct an airflow from upstream to downstream.

The partition member 26 is preferably formed of a member with high thermal conductivity, for example, metal such as aluminum, stainless, or the like. The partition member 26 may be formed integrally with the stator core 17.

When the electric motor 1 with the above configuration is energized, temperatures of the stator core 17, the coil 18, the rotor core 15, and the rotor conductor 16 rise. As theses temperature rise, temperatures of the shaft 11 and the bearings 22 and 23 also rise. When the electric motor 1 is energized and the rotor core 15 and the shaft 11 rotate together, the fan 14 rotates integrally with the shaft 11, and air from outside the electric motor 1 flows through the inflow hole 19a into the interior of the electric motor 1. The air that flows in through the inflow hole 19a passes through the upstream ventilation path 24a, then through the downstream ventilation path 24b or 24c, and flows out from the outflow hole 19b to the outside of the electric motor 1.

As described above, in the electric motor 1 according to Embodiment 1, the total length of the inner circumferential surface lengths of the downstream ventilation paths 24b and 24c in the XZ plane are longer than the inner circumferential surface length of the upstream ventilation path 24a in the XZ plane. Thus, compared with an electric motor including a stator that includes a ventilation path that does not branch, the cooling efficiency in the downstream of the ventilation path 24 of the electric motor 1 is high. This results in the electric motor 1 having high cooling efficiency.

When the partition member 26 is made of a member having high thermal conductivity, the cooling efficiency in the downstream of the ventilation path 24 can be further improved.

Embodiment 2

The ventilation path 24 can have any shape that has a branch and can enhance the cooling efficiency in the downstream. An electric motor 2 including a ventilation path 28 having a shape different from the electric motor 1 according to Embodiment 1 is described in Embodiment 2.

The cross-sectional view of the electric motor 2 in the YZ plane is similar to that of FIG. 1 except that the stator core 17 included in the electric motor 2 includes the ventilation path 28.

Figure 5:
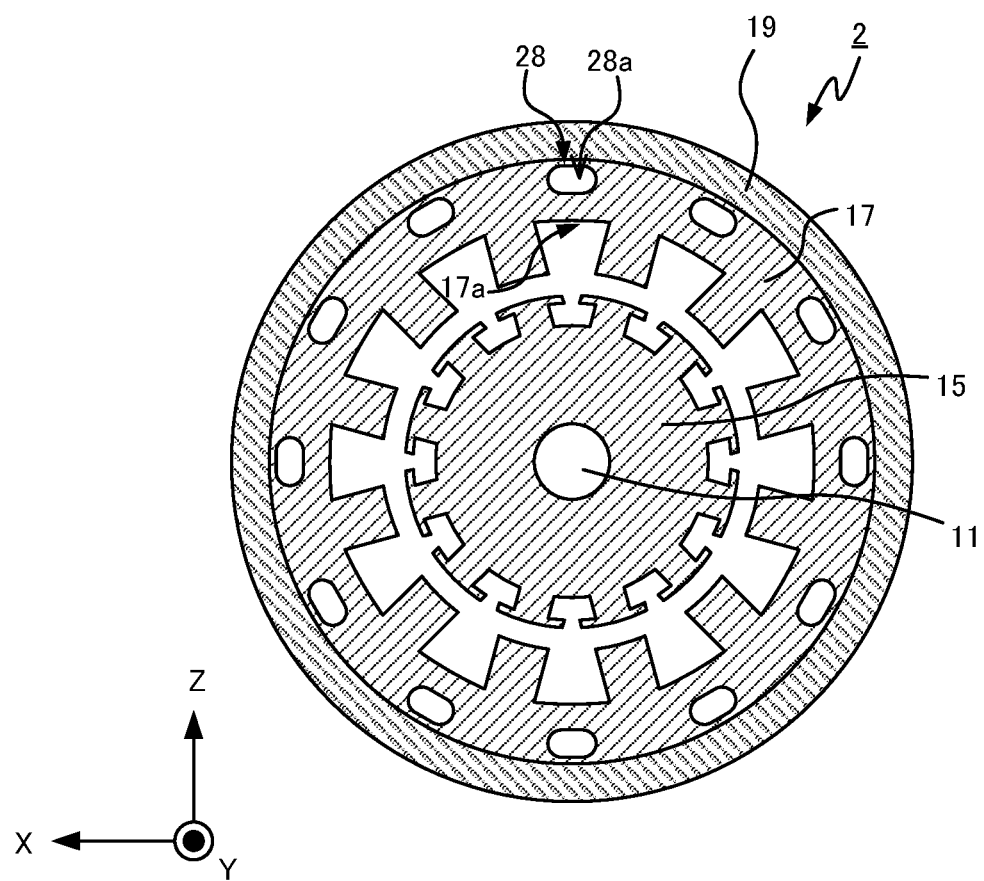
FIG. 5 is a cross-sectional view of an electric motor according to Embodiment 2.
Figure 6:
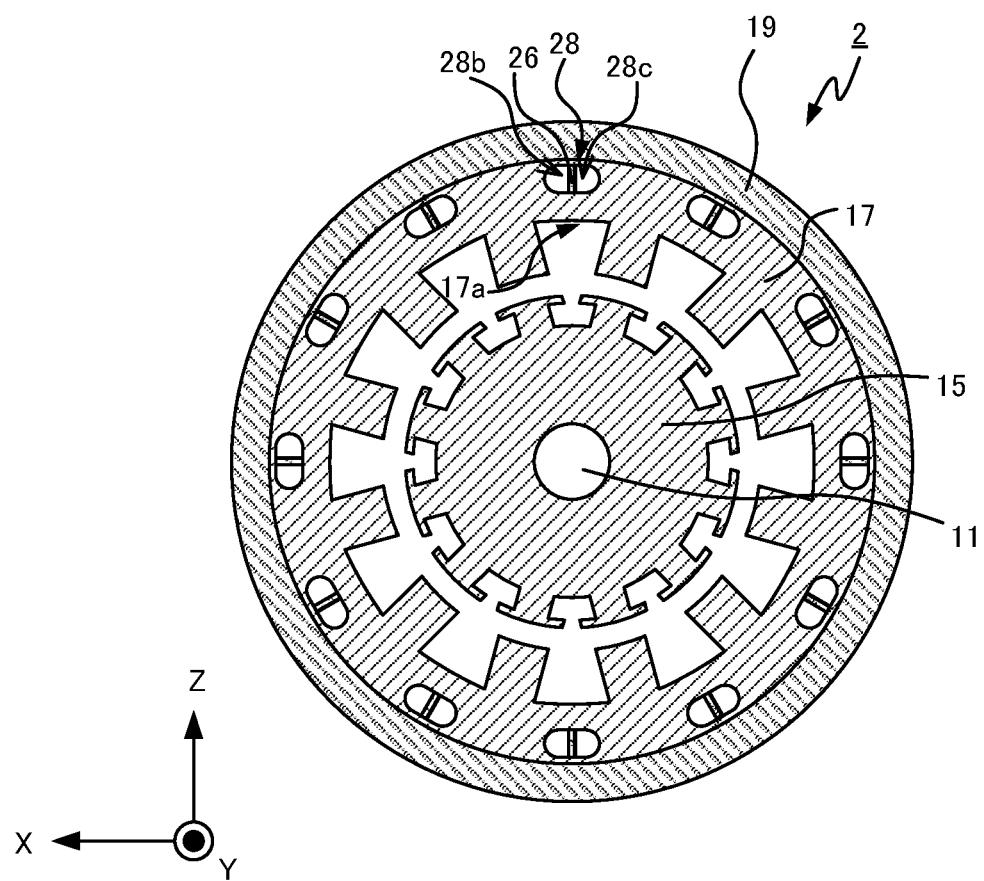
FIG. 6 is a cross-sectional view of the electric motor according to Embodiment 2.

The ventilation path 28 has a branched shape from an upstream end to a plurality of downstream ends. Specifically, the ventilation path 28 includes an upstream ventilation path 28a illustrated in FIG. 5 and downstream ventilation paths 28b and 28c illustrated in FIG. 6. Similarly to FIG. 2, FIG. 5 is a cross-sectional view of the electric motor 2 in the XZ plane through an upstream portion of the ventilation path 28 as the electric motor 2 is viewed in a negative Y-axis direction. Also, similarly to FIG. 3, FIG. 6 is a cross-sectional view of the electric motor 2 in the XZ plane through a downstream portion of the ventilation path 28 as the electric motor 2 is viewed in the negative Y-axis direction. In FIGS. 5 and 6, components of the electric motor 2 other than the shaft 11, the rotor core 15, the stator core 17, and the frame 19 are omitted to simplify illustration. One end of the upstream ventilation path 28a faces the second bracket 21. One end of each of the downstream ventilation paths 28b and 28c is in communication with another end of the upstream ventilation path 28a and another end thereof faces the first bracket 20.

Lengths of wetted perimeters of the branched ventilation paths 28 are longer than a length of a wetted perimeter of the unbranched ventilation path 28. Specifically, a total length of inner circumferential surface lengths of the downstream ventilation paths 28b and 28c in the XZ plane is longer than an inner circumferential surface length of the upstream ventilation path 28a in the XZ plane.

Preferably, the cross-sectional area of the upstream ventilation path 28a in the XZ plane can be considered to match a total area of the cross-sectional areas of the downstream ventilation paths 28b and 28c in the XZ plane. In other words, preferably, the cross-sectional area of the ventilation path 28 can be considered to be constant from the upstream end to the plurality of downstream ends. This can suppress reduction of cooling efficiency caused by increase in ventilation resistance of the ventilation path 28 due to branching.

As illustrated in FIG. 5, the shape of the upstream ventilation path 28a in the XZ plane is a shape obtained by connecting by straight lines outer edges of two circles having the same diameter. As illustrated in FIG. 6, the shape of the downstream ventilation paths 28b and 28c is a shape obtained by dividing the shape of the upstream ventilation path 28a in the XZ plane equally by lines parallel to the Z axis. The downstream ventilation paths 28b and 28c are arranged such that the straight portions in the XZ plane face each other.

For example, ventilation path 28 is obtained by inserting a partition member 26 into a through hole as in Embodiment 1.

Specifically, the ventilation path 28 is obtained by inserting the plate-shaped partition member 26 into a through hole having a shape, in the XZ plane, obtained by connecting by straight lines the outer edges of two circles having the same diameter. By inserting the plate-shaped partition member 26, having an X-axis direction width that is the same length as a difference between the X-axis direction widths of the upstream portion and the downstream portion of the through hole, into the through hole having an X-axis direction width of the downstream portion greater than that of the upstream portion, the ventilation path 28 can be obtained in which the cross-sectional area of the upstream portion in the cross section perpendicular to the penetration direction can be considered to match the cross-sectional area of the downstream portion in the cross section perpendicular to the penetration direction.

The location of the branching is preferably closer to the plurality of downstream ends than the middle of the ventilation path 28, that is, closer to a plurality of ends facing the first bracket 20.

By providing the ventilation path 28 having the aforementioned structure, the cooling efficiency of the ventilation path 28 in the downstream portion can be increased relative to that of the ventilation path 28 in the upstream portion.

The downstream ventilation paths 28b and 28c are preferably arranged adjacent to each other. Specifically, the downstream ventilation paths 28b and 28c are preferably arranged adjacent to each other to the extent that changes in air flow velocity caused by air hitting the partition member 26 that branches the ventilation path 28 can be suppressed. In a case where the ventilation path 28 is formed by inserting the partition member 26 into the through hole, the partition member 26 is preferably thin enough not to obstruct an airflow from upstream to downstream.

When the electric motor 2 with the above configuration is energized and the rotor core 15 and the shaft 11 rotate together, the fan 14 rotates integrally with the shaft 11, and air from outside the electric motor 2 flows through the inflow hole 19a into the interior of the electric motor 2. The air that flows in through the inflow hole 19a passes through the upstream ventilation path 28a, and then flows, via the downstream ventilation path 28b or the downstream ventilation path 28c, out from the outflow hole 19b to the outside of the electric motor 2.

As described above, in the electric motor 2 according to Embodiment 2, the total length of the inner circumferential surface lengths of the downstream ventilation paths 28b and 28c in the XZ plane is longer than the inner circumferential surface length of the upstream ventilation path 28a in the XZ plane. Thus compared with an electric motor including a stator that includes a ventilation path that does not branch, the cooling efficiency in the downstream of the ventilation path 28 of the electric motor 2 is high. This results in the electric motor 2 having high cooling efficiency.

Embodiment 3

Although the ventilation path 24 of Embodiment 1 and the ventilation path 28 of Embodiment 2 branch into two, the ventilation paths 24 and 28 may branch into three or more flow paths. An electric motor 3 including a ventilation path 29 having a shape different from those of Embodiments 1 and 2 is described in Embodiment 3.

Figure 7:
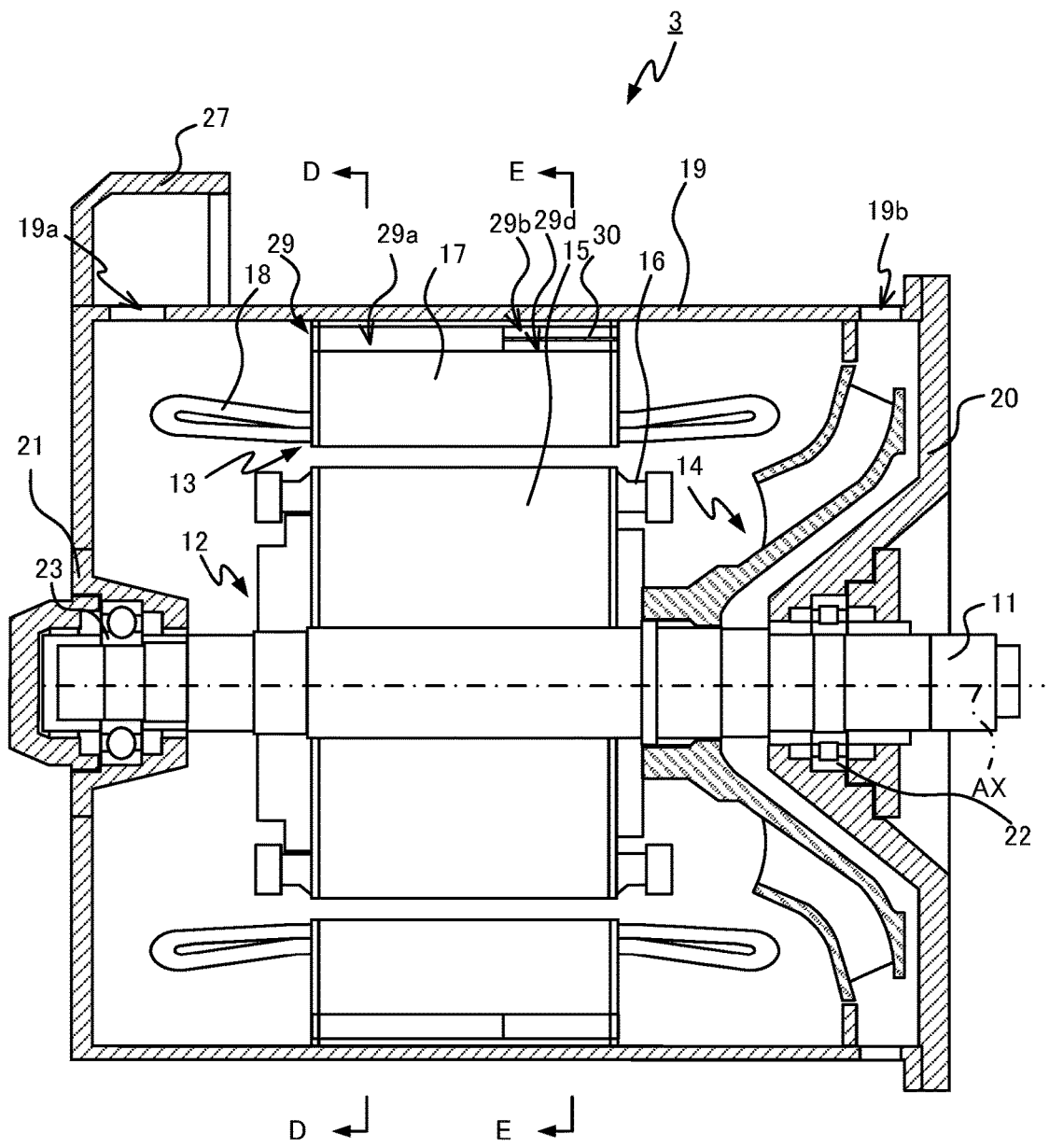
FIG. 7 is a cross-sectional view of an electric motor according to Embodiment 3.
Figure 7:
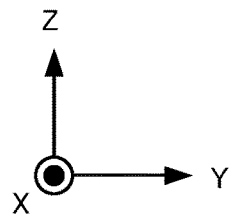
Figure 8:
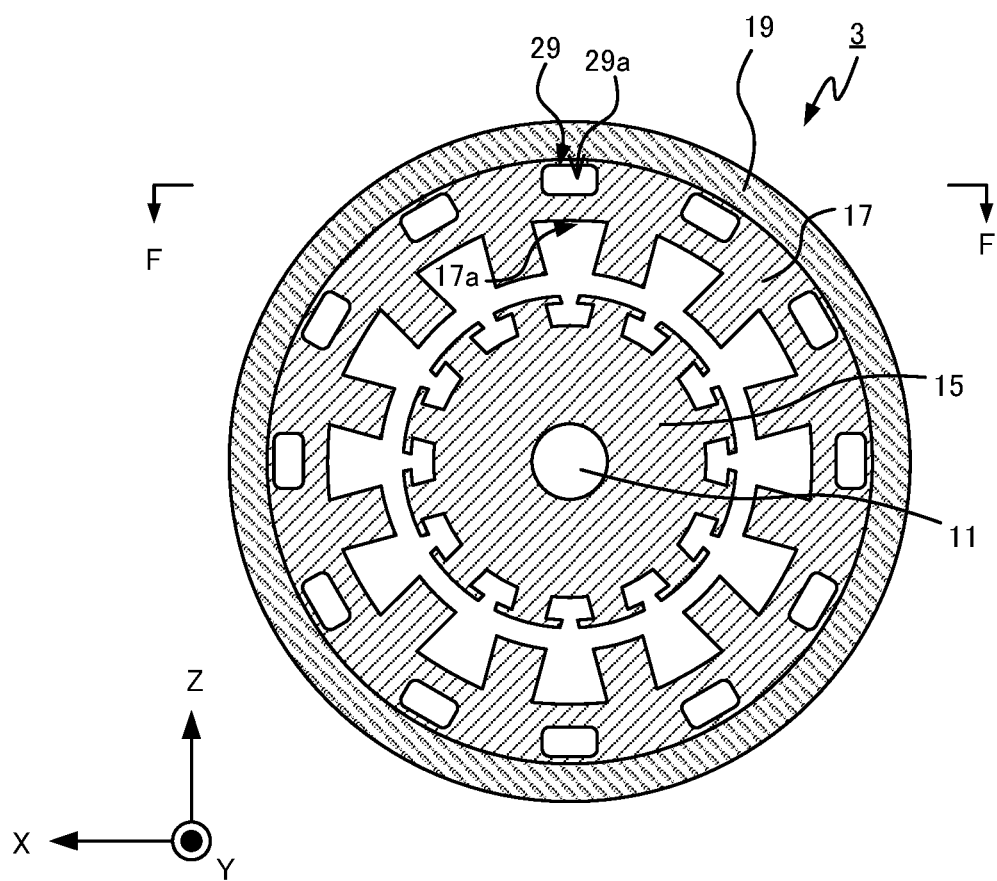
FIG. 8 is a cross-sectional view of the electric motor according to Embodiment 3, taken along line D-D of FIG. 7.
Figure 9:
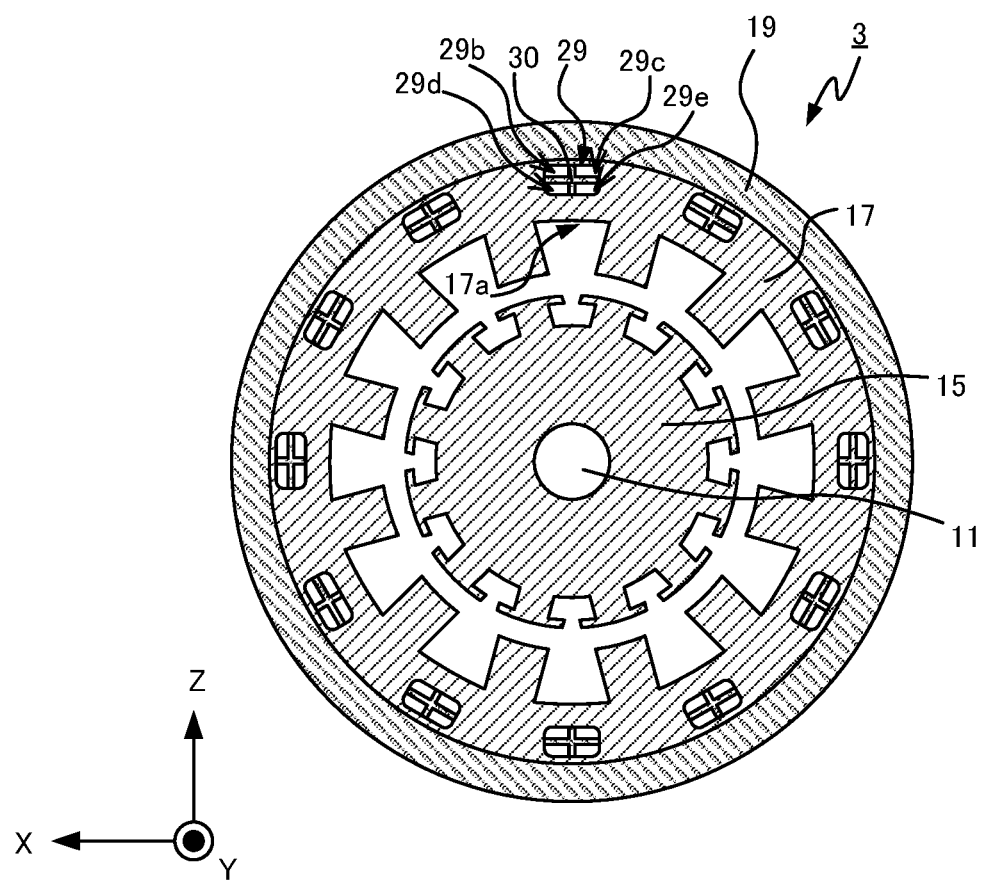
FIG. 9 is a cross-sectional view of the electric motor according to Embodiment 3, taken along line E-E of FIG. 7.

The electric motor 3 illustrated in FIG. 7 includes a ventilation path 29 having a shape branching into four from an upstream end to a plurality of downstream ends. Specifically, the ventilation path 29 is an upstream ventilation path 29a illustrated in FIG. 8, which is a cross-sectional view taken along line D-D of FIG. 7, and downstream ventilation paths 29b, 29c, 29d, and 29e illustrated in FIG. 9, which is a cross-sectional view taken along line E-E of FIG. 7. In FIGS. 8 and 9, components of the electric motor 3 other than the shaft 11, the rotor core 15, the stator core 17, and the frame 19 are omitted to simplify illustration. One end of the upstream ventilation path 29a faces the second bracket 21. One end of each of the downstream ventilation paths 29b, 29c, 29d, and 29e is in communication with another end of the upstream ventilation path 29a, and another end thereof faces the first bracket 20.

Lengths of wetted perimeters of the branched ventilation paths 29 are longer than a length of a wetted perimeter of an unbranched ventilation path 29. Specifically, a total length of inner circumferential surface lengths of the downstream ventilation paths 29b, 29c, 29d, and 29e in the XZ plane is longer than an inner circumferential surface length of the upstream ventilation path 29a in the XZ plane.

Preferably, the cross-sectional area of the upstream ventilation path 29a in the XZ plane can be considered to match the total of the cross-sectional areas of the downstream ventilation paths 29b, 29c, 29d, and 29e in the XZ plane. In other words, preferably, the cross-sectional area of the ventilation path 29 can be considered to be constant from the upstream end to the plurality of downstream ends. This can suppress reduction of cooling efficiency caused by increase in ventilation resistance of the ventilation path 29 due to branching.

As illustrated in FIG. 8, the upstream ventilation path 29a in the XZ plane has a rectangular shape with rounded corners. As illustrated in FIG. 9, the shapes of the downstream ventilation paths 29b, 29c, 29d, and 29e are a shape obtained by dividing the shape of the upstream ventilation path 29a in the XZ plane equally into four by a line parallel to the X axis and a line parallel to the Z axis.

Figure 10:
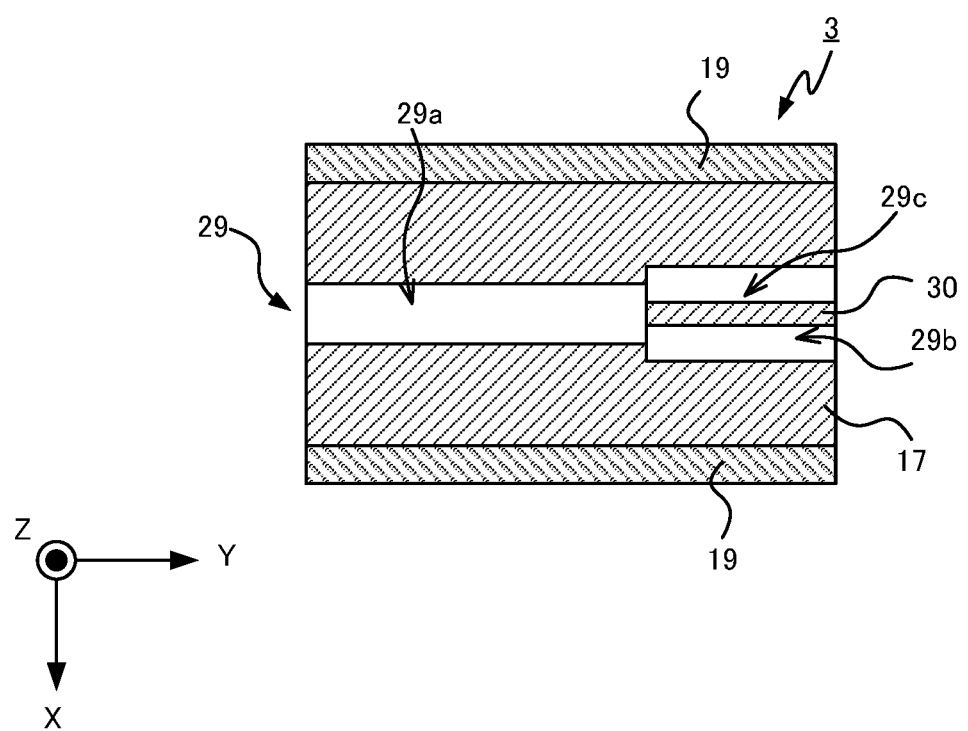
FIG. 10 is a cross-sectional view of the electric motor according to Embodiment 3, taken along line F-F of FIG. 8.

For example, as illustrated in FIG. 10, which is a cross-sectional view taken along line F-F of FIG. 8, the ventilation path 29 is formed by inserting a partition member 30 into the through hole.

Specifically, the ventilation path 29 is obtained by inserting the partition member 30 with a cross shape in the XZ plane into the through hole having a rectangular shape with rounded corners in the XZ plane.

The location of the branching is preferably closer to the plurality of downstream ends than the middle of the ventilation path 29, that is, closer to a plurality of ends facing the first bracket 20.

By providing the ventilation path 29 having the aforementioned structure, the cooling efficiency of the ventilation path 29 in the downstream portion can be increased relative to that of the ventilation path 29 in the upstream portion.

The downstream ventilation paths 29b, 29c, 29d, and 29e are preferably arranged adjacent to each other. Specifically, the downstream ventilation paths 29b, 29c, 29d, and 29e are preferably arranged adjacent to each other to the extent that changes in air flow velocity caused by air hitting the partition member 30 that branches the ventilation path 29 can be suppressed. In a case where the ventilation path 29 is formed by inserting the partition member 30 into the through hole, the plate-shaped member of the partition member 30 parallel to the XZ plane and the plate-shaped member of the partition member 30 parallel to the XY plane are preferably thin enough not to obstruct airflow from upstream to downstream.

When the electric motor 3 with the above configuration is energized and the rotor core 15 and the shaft 11 rotate together, the fan 14 rotates integrally with the shaft 11, and air from outside the electric motor 3 flows through the inflow hole 19a into the interior of the electric motor 3. The air that flows in through the inflow hole 19a passes through the upstream ventilation path 29a and then through the downstream ventilation path 29b, the downstream ventilation path 29c, the downstream ventilation path 29d, or the downstream ventilation path 29e and flows out from the outflow hole 19b to the outside of the electric motor 3.

As described above, in the electric motor 3 according to Embodiment 3, the total length of the inner circumferential surface lengths of the downstream ventilation paths 29b, 29c, 29d, and 29e in the XZ plane is longer than the inner circumferential surface length of the upstream ventilation path 29a in the XZ plane. Thus, compared with an electric motor including a stator that includes a ventilation path that does not branch, the cooling efficiency in the downstream of the ventilation path 29 of the electric motor 3 is high. This results in the electric motor 3 having high cooling efficiency The present disclosure is not limited to the embodiments described above.

Figure 11:
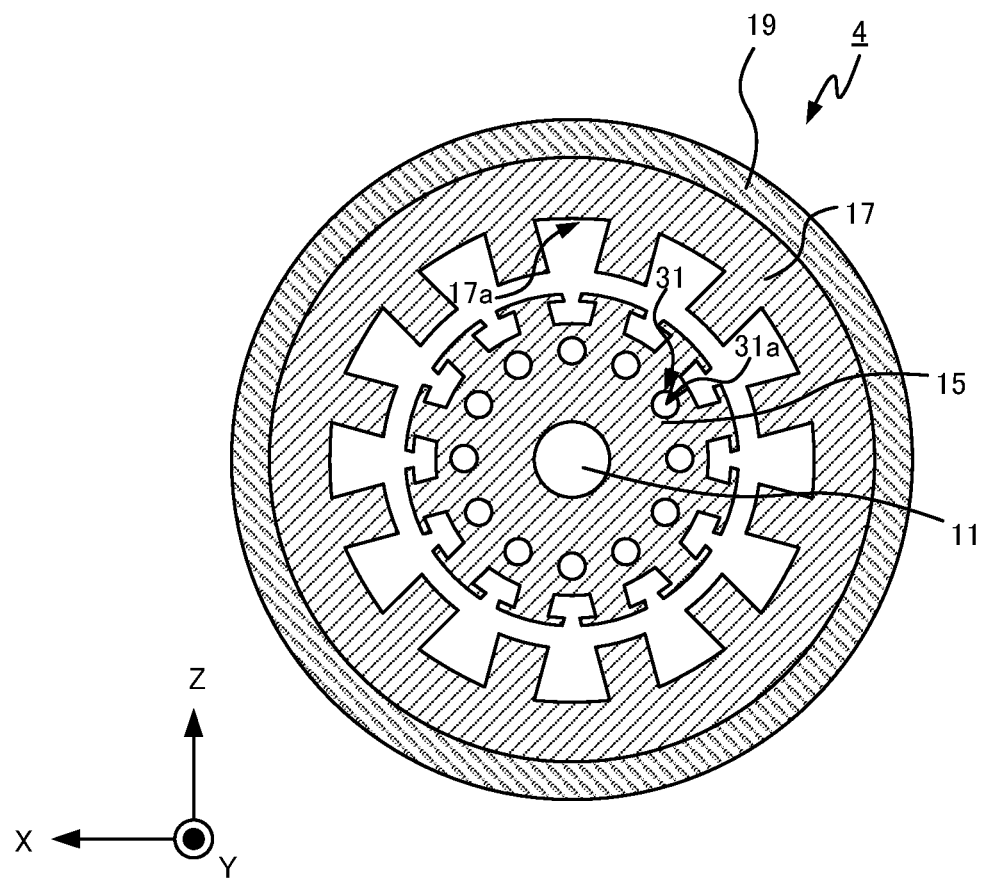
FIG. 11 is a cross-sectional view of a first modified example of an electric motor according to an embodiment.
Figure 12:
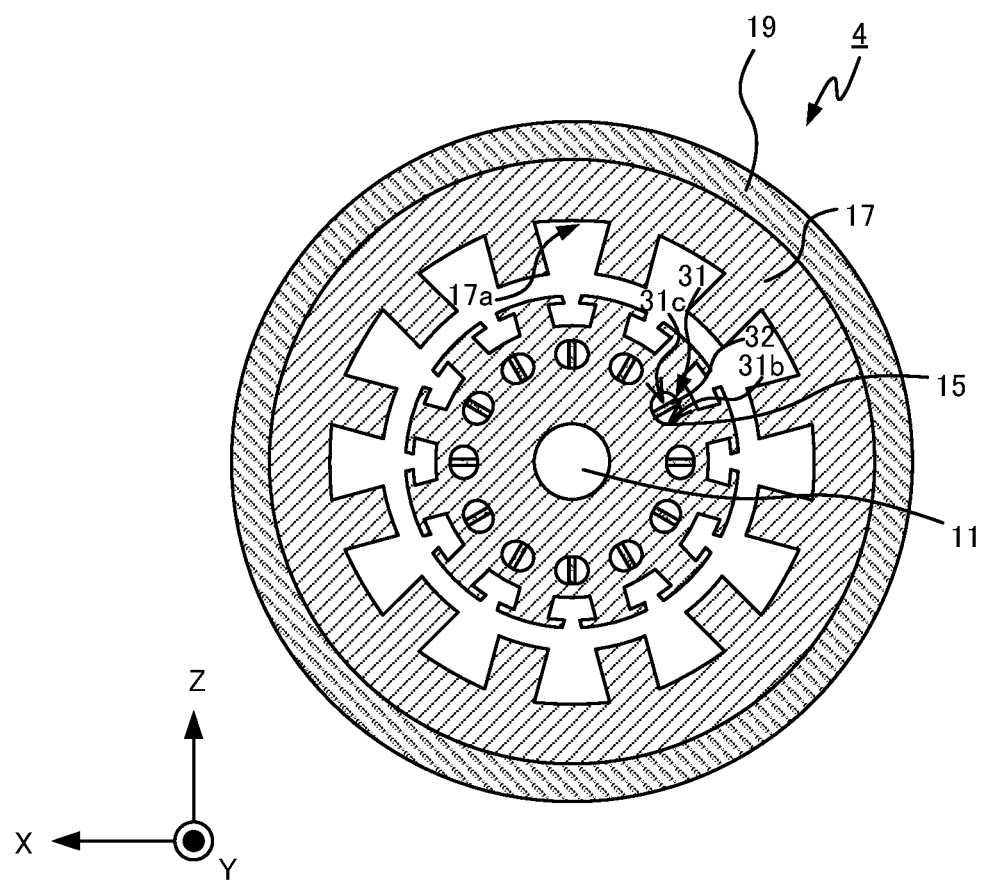
FIG. 12 is a cross-sectional view of the first modified example of the electric motor according to the embodiment.

Although Embodiments 1 to 3 describe examples in which the ventilation path 24, 28, and 29 passing through the stator core 17 is formed in the stator core 17 included in each of the electric motors 1 to 3, a ventilation path may be formed in the rotor core 15. The rotor core 15 of an electric motor 4 illustrated in FIGS. 11 and 12 includes ventilation paths 31. Similarly to the ventilation path 24, the ventilation path 31 has a branched shape from an upstream end to a plurality of downstream ends. Specifically, the ventilation path 31 includes an upstream ventilation path 31a having one end facing the second bracket 21, as illustrated in FIG. 11. The ventilation path 31 further includes downstream ventilation paths 31b and 31c having one end being in communication with another end of the upstream ventilation path 31a and another end facing the first bracket 20, as illustrated in FIG. 12. The downstream ventilation paths 31b and 31c are formed by partitioning a downstream portion of the ventilation path 31 by a partition member 32.

Figure 13:
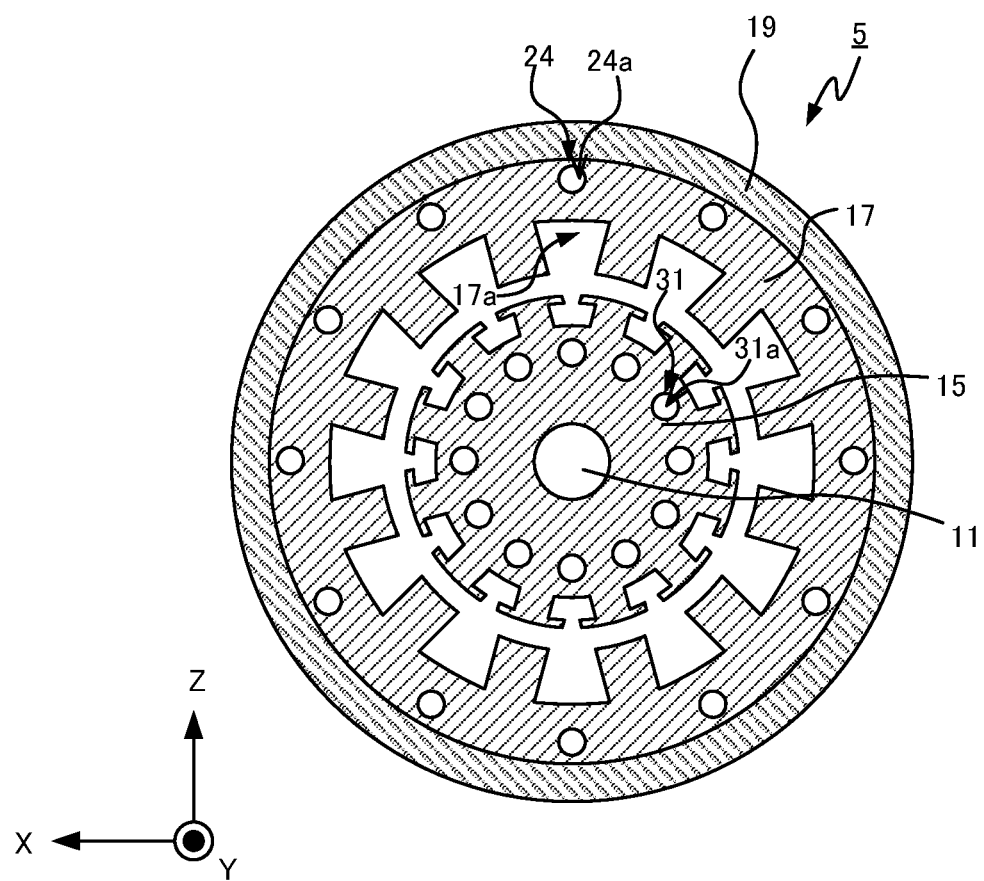
FIG. 13 is a cross-sectional view of a second modified example of an electric motor according to an embodiment.
Figure 14:
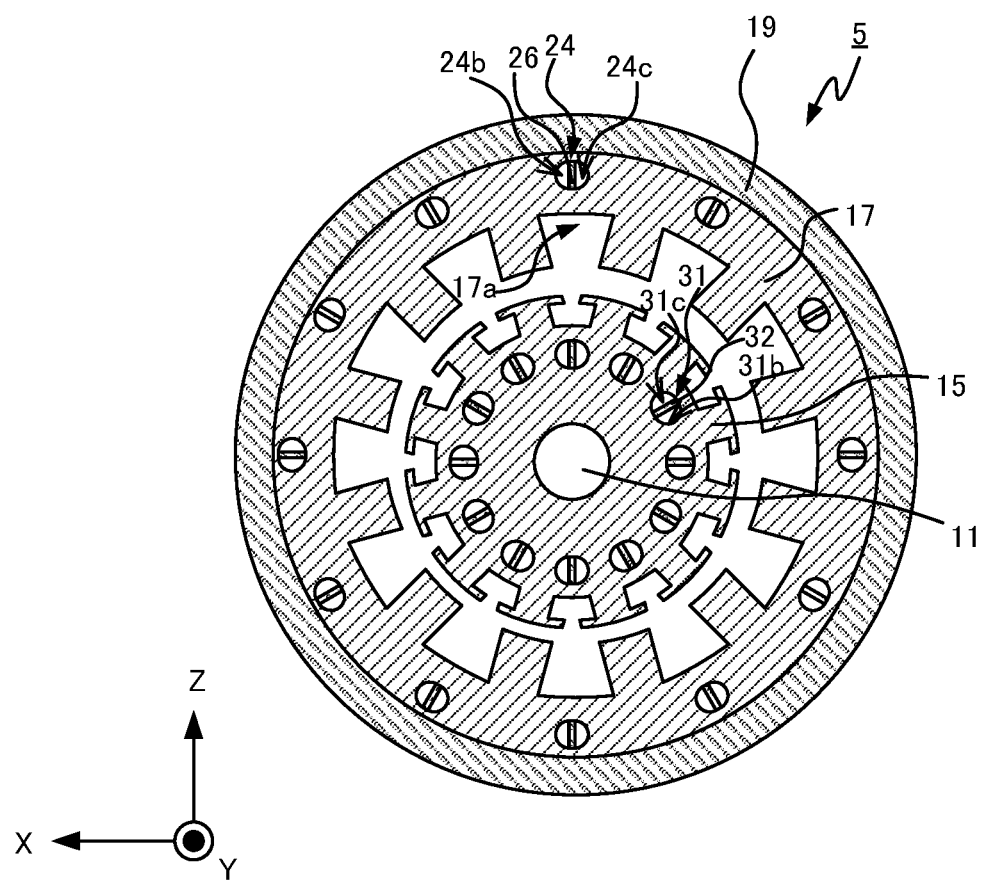
FIG. 14 is a cross-sectional view of the second modified example of the electric motor according to the embodiment.

The ventilation paths may be formed in both the stator core 17 and the rotor core 15. In an electric motor 5 illustrated in FIGS. 13 and 14, the rotor core 15 includes a ventilation path 31 and the stator core 17 includes a ventilation path 24. The shape of the ventilation path 31 is similar to that of the electric motor 4 illustrated in FIGS. 11 and 12. The shape of the ventilation path 24 is similar to that of the electric motor 1 according to Embodiment 1.

The ventilation paths 24, 28, 29, and 31 may extend in a direction parallel to the rotation axis AX or extend in a direction crossing the rotation axis AX.

Figure 15:
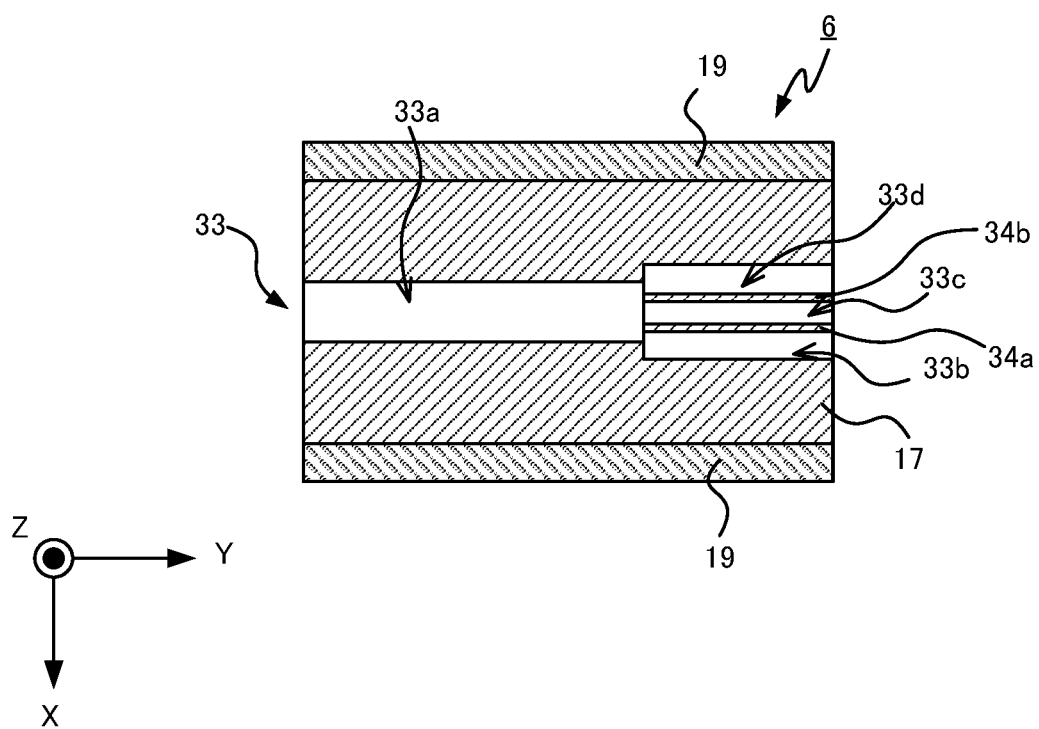
FIG. 15 is a cross-sectional view of a third modified example of an electric motor according to an embodiment.

The shapes of the ventilation paths 24, 28, 29, 31 are not limited to the aforementioned examples, and can be any shape that can achieve higher cooling efficiency in the downstream portion than in the upstream portion. As an example, FIG. 15 illustrates an electric motor 6 including an upstream ventilation path 33 formed by inserting a plurality of partition members 34a and 34b into the through hole. FIG. 15 is illustrated in the same perspective as that of FIG. 4. The ventilation path 33 includes an upstream ventilation path 33a and downstream ventilation paths 33b, 33c, and 33d. One end of the upstream ventilation path 33a faces the second bracket 21. One end of each of the downstream ventilation paths 33b, 33c, and 33d is in communication with another end of the upstream ventilation path 33a, and another end thereof faces the first bracket 20. The main surface of each of the partition members 34a and 34b is parallel to the YZ plane.

The partition members 26, 30, 32, 34a, and 34b may be made of a sufficiently thin plate-like member. Sufficient thinning of the partition members 26, 30, 32, 34a, and 34b suppresses changes in air flow velocity due to air hitting the partition members 26, 30, 32, 34a, and 34b.

The electric motors 1 to 6 may be a forced-air cooling type of electric motor that cools components of the electric motors 1 to 6 by air blown in from a blower disposed outside. The electric motors 1 to 6 may be a totally enclosed type of electric motor that cools the components of the electric motors 1 to 6 by circulating air inside. The electric motors 1 to 6 may be a frameless type of electric motor that does not have the frame 19. In this case, the inflow hole 19a may be formed in the second bracket 21 and the outflow hole 19b may be formed in the first bracket 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3, 4, 5, 6 Electric motor
11 Shaft
12 Rotor
13 Stator
14 Fan
15 Rotor core
16 Rotor conductor
17 Stator core
17a Slot
18 Coil
19 Frame
19a Inflow hole
19b Outflow hole
20 First Bracket
21 Second bracket
22, 23 Bearing
24, 28, 29, 31, 33 Ventilation path
24a, 28a, 29a, 31a, 33a Upstream ventilation path
24b, 24c, 28b, 28c, 29b, 29c, 29d, 29e, 31b, 31c, 33b, 33c, 33d Downstream ventilation path
26, 30, 32, 34a, 34b Partition member
27 Cover
AX Rotation axis

The invention claimed is:
1. An electric motor, comprising:
a shaft supported rotatably around a rotation axis;
a rotor located radially outward from the shaft and rotatable integrally with the shaft; and
a stator radially opposing the rotor to define a space therebetween, wherein
at least one of the rotator or the stator includes a ventilation path that is a through hole, the ventilation path has a branched shape from an upstream end to a plurality of downstream ends, and
a total length of inner circumferential surface lengths of branched ventilation paths in a cross section perpendicular to a penetration direction of the ventilation path is longer than an inner circumferential surface length of an unbranched ventilation path in the cross section perpendicular to the penetration direction, the branched ventilation paths being branched portions of the ventilation path, the unbranched ventilation path being an unbranched portion of the ventilation path.
2. The electric motor according to claim 1, wherein the branched ventilation paths are arranged adjacent to each other.

3. The electric motor according to claim 2, wherein a total area of cross-sectional areas of the branched ventilation paths in the cross section perpendicular to the penetration direction is considered to match a cross-sectional area of the unbranched ventilation path in the cross section perpendicular to the penetration direction.

4. The electric motor according to claim 2, wherein the ventilation path includes at least one partition member that partitions a downstream portion of the ventilation path.

5. The electric motor according to claim 4, wherein the at least one partition member includes a plate-like member having side surfaces that abut an inner circumferential surface of the through hole and extending from a downstream end of the through hole in the penetration direction of the through hole.

6. The electric motor according to claim 5, wherein
the partition member includes a plurality of the plate-like members, and
main surfaces of the plurality of the plate-like members are arranged parallel to one another to define a space therebetween.

7. The electric motor according to claim 4, wherein
the stator radially opposes the rotor to define a space therebetween, and includes a stator core including the ventilation path and slots, and coils received in the slots of the stator core, and
the at least one partition member is formed integrally with the stator core.

8. The electric motor according to claim 1, wherein a total area of cross-sectional areas of the branched ventilation paths in the cross section perpendicular to the penetration direction is considered to match a cross-sectional area of the unbranched ventilation path in the cross section perpendicular to the penetration direction.

9. The electric motor according to claim 8, wherein the ventilation path includes at least one partition member that partitions a downstream portion of the ventilation path.

10. The electric motor according to claim 9, wherein the at least one partition member includes a plate-like member having side surfaces that abut an inner circumferential surface of the through hole and extending from a downstream end of the through hole in the penetration direction of the through hole.

11. The electric motor according to claim 10, wherein
the partition member includes a plurality of the plate-like members, and
main surfaces of the plurality of the plate-like members are arranged parallel to one another to define a space therebetween.

12. The electric motor according to claim 9, wherein
the stator radially opposes the rotor to define a space therebetween, and includes a stator core including the ventilation path and slots, and coils received in the slots of the stator core, and
the at least one partition member is formed integrally with the stator core.

13. The electric motor according to claim 1, wherein the branched shape of the ventilation path is located closer to the plurality of downstream ends than a middle of the ventilation path.

14. The electric motor according to claim 1, wherein the ventilation path includes at least one partition member that partitions a downstream portion of the ventilation path.

15. The electric motor according to claim 14, wherein the at least one partition member includes a plate-like member having side surfaces that abut an inner circumferential surface of the through hole and extending from a downstream end of the through hole in the penetration direction of the through hole.

16. The electric motor according to claim 15, wherein
the partition member includes a plurality of the plate-like members, and
main surfaces of the plurality of the plate-like members are arranged parallel to one another to define a space therebetween.

17. The electric motor according to claim 14, wherein
the stator radially opposes the rotor to define a space therebetween, and includes a stator core including the ventilation path and slots, and coils received in the slots of the stator core, and
the at least one partition member is formed integrally with the stator core.

18. The electric motor according to claim 1, further comprising:
a frame having an inner circumferential surface to which the stator is fixed, and having an inflow hole through which air from outside flows in and an outflow hole through which the air flowing through the inflow hole flows to the outside, wherein
the air flowing through the inflow hole flows through the ventilation path and out from the outflow hole.

* * * * *